Patented May 26, 1936

2,042,218

UNITED STATES PATENT OFFICE 2,042,218

RECOVERY OF ORGANIC ACID ESTERS

Theodore Evans and Karl R. Edlund, Berkeley, Calif., assignors to Shell Development Company, San Francisco, Calif., a corporation of Delaware No Drawing. Application August 4, 1934,
Serial No. 738,542

22 Claims. (Cl. 260—106)

This invention relates to the production of organic acid esters and more particularly to the recovery of such esters from admixture with acids. It contemplates a process wherein an acid is selectively extracted from such mixtures prior to the recovery of esters therefrom. It is further concerned with a novel method for effecting such ester recovery by binary azeotropic distillation.

In the preparation of esters by processes employing acid catalysts, it is advantageous to remove the catalyst acid as completely as possible before attempting to separate the ester from the reaction mixture, as such acids tend to decompose the ester at the temperatures required for its distillation. This may be accomplished by water washing, but such a procedure is undesirable, as any organic acid present is simultaneously removed and made unsuitable for use in further esterification, unless recourse is had to reconcentration which is an expensive procedure. Alternatively, the catalyst acid may be reacted with a metal salt of the ester acid, thereby forming an acid which may be usefully employed for further esterification. This method of operation is difficult, however, as it involves treating a liquid with a solid, and moreover, under substantially anhydrous conditions the reaction is comparatively slow unless elevated temperatures are employed. The addition of small amounts of water to facilitate the reaction leads to further difficulties, not only by necessitating an extra distillation to remove the water added, but also by producing solid cakes in the still.

We have invented a process of recovering esters whereby these difficulties may be entirely avoided. Our invention is applicable to any esterification process regardless of the esterification methods employed or starting materials used. It is particularly adapted to the recovery of esters from acid mixtures such as are encountered in the esterification of olefines. It can be used with especial advantage in connection with esterification methods involving a preliminary partial mechanical separation of the catalyst acid from the reaction mixture, but is independent of the amounts of acid or acids and ester or esters present and of the proportion or nature of the other materials which may be present in the mixture. It may be used in connection with the preparation of any ester from an alcohol or olefine or mixture thereof and an organic acid with any mineral acid-acting catalyst.

For the purpose of affording a clear understanding of our invention, but without imposing limitation thereon, it will be described with more particular reference to the recovery of esters from acid mixtures such as are encountered in the catalytic esterification of olefines. In commercially feasible processes of this class, acid mixtures are obtained as intermediate products, comprising: the carboxylic acid or acids used in the esterification, the ester or esters produced, and varying amounts, sometimes quite small but nevertheless important, of the mineral acid-acting acid which is used as the esterification catalyst. Paraffin hydrocarbons and unreacted olefines may also be present.

In practicing our invention with such a mixture, we may proceed substantially as follows. The ester mixture, preferably in the liquid state, as increased surface contact is thereby promoted, although the vaporous state may also be used, is contacted with a suitable selective solvent for the mineral acid-acting acid in any suitable manner. For example, the two agents may be agitated in a common vessel or subjected to countercurrent flow and the like.

As a suitable selective solvent for the relatively strong acid, we prefer to use an aqueous solution of the esterifying acid or acids present in the ester mixture being treated. The concentration of carboxylic acid in this solution is chosen so that at some stage when it is contacted with the ester mixture substantially no change occurs in the carboxylic acid concentration of the latter, i. e., the aqueous extracting solution and the ester mixture are initially practically at equilibrium from the carboxylic acid standpoint. However, when the aqueous solution is stirred with the ester mixture, the mineral acid-acting acid content of the latter is extracted substantially instantaneously and completely into the aqueous phase.

In accordance with the law of partition when water is shaken with an esterification mixture comprising carboxylic acid, mineral acid-acting acid and ester, the greater part of the more water soluble constituents of the mixture, particularly the carboxylic and mineral acid-acting acids, will find their way into the water and may be separated practically completely by repeated extractions with fresh water. This is the old method of procedure. In each treatment with water it is found that the carboxylic acid and mineral acid-acting acid present is divided between the two phases in proportion to the solubility of these acids in each solvent. That is, the ratio of the concentrations of the acids in the water phase to the concentration of the acids in the ester phase is always the same. By using a carboxylic acid solution of a concentration in the proper ratio to the concentration of carboxylic acid in the ester mixture there will be no transfer of carboxylic acid but a selective extraction of catalyst acid since there will be substantially none of the latter in the carboxylic acid solution used as extractant. To take a hypothetical simplified case, assume that the solubility of both carboxylic acid and catalyst acid are the same in water as they are in the reacted esterification mixture being treated. It will be noted that this does not involve the assumption that the solubility of the carboxylic acid in water is the same as that of the catalyst acid. Now when the esterification mixture is treated with pure water, in accordance with prior art teachings, a weight of water equal to the weight of the ester mixture will reduce the concentration of both acids by half. In the present case the use of a carboxylic acid solution of the same concentration as that in the ester mixture will under the above conditions reduce the concentration of the catalyst acid by half but there will be substantially no change in the carboxylic acid content of the treated mixture.

After neutralization of the extracted catalyst acid the selective solvents may be used for the removal of more catalyst acid from further batches of ester mixture. Now as pointed out in subsequent paragraphs there may be some fluctuation in the composition of the ester mixture successively treated. For example, the carboxylic acid content may vary from batch to batch. It is of course possible to analyze each batch for carboxylic acid and adjust the strength of the extracting solution accordingly. However, such a tedious procedure is unnecessary because such fluctuations in the composition of the ester mixtures treated will be compensated by changes in the carboxylic acid content of the extracting solution whereby carboxylic acid will be given up by or taken up by the latter in accordance with the partition coefficient of the carboxylic acid between the two phases present. For example, if a batch of ester mixture treated has a carboxylic acid content of 8% and a solvent medium contains 10% carboxylic acid, the carboxylic acid content of both phases will become 9% when equilibrium is reached using, as before, equal weights of extractant and ester mixture. There is thus a transference of carboxylic acid to the ester phase. If the same extracting solution is now applied to an ester mixture of, say 11% free carboxylic acid content, the carboxylic acid content of the extracting agent will return to its original value. It is thus clear that there will be no substantial loss of carboxylic acid since any excess above the average equilibrium value removed in any abnormal cycle of operation will be returned in a subsequent cycle or cycles in which ester mixtures of lower carboxylic acid content are present.

The aqueous extracting solution preferably also contains a reagent which can react with the extracted mineral acting acid to present the latter's accumulation in the extracting medium during reuse. For this reaction, preference is given metal salts of the esterifying acid present, although other salts may be used. The extracted mineral acting acid is converted by such preferred salts to the corresponding metal salt and free carboxylic acid is liberated. Depending on the solubility of the metal salt of the mineral acting acid, it may be immediately precipitated or only reach saturation in the solution after further reuse, cooling or storage theref. In any case it will eventually appear and may be removed by filtration and the like. The extracting solution should be replenished, therefore, in the metal salt of the esterifying acid from time to time, so there will always be sufficient present to react with the extracted acid.

An obvious modification of this procedure is to extract the mineral acting acid and then add the metal salt of the esterifying acid as a separate later step.

In either case the operations may be continuous, intermittent, or batch, the selective extracting solution being available for reuse in removing mineral acting acid from fresh ester mixtures. For the initiation of the selective extraction cycle, the extracting solution may be prepared by dissolving the required amount of esterifying acid in the water to be used, as determined, by calculation from the partition coefficient of the esterifying acid involved between water and the components of the ester mixture to be extracted. Alternatively the selective extracting solution may be formed from the esterifying acid present in the ester mixture. Thus water alone may be used for the first extraction in which case esterifying acid as well as catalyst acid will be removed from the ester mixture. But on continued reuse of the solution an equilibrium with respect to esterifying (carboxylic) acid will eventually be reached after which the solution will function as a selective solvent for the relatively strong acid. Furthermore, the extracting medium will automatically adjust itself in accordance with the partition coefficient of the esterifying acid to fluctuations in the composition of the ester mixtures treated.

The carboxylic acid formed by the reaction of the extracted mineral acting acid with the metal salt present in, or added to, the solution, will be returned to the ester mixture in the same, or succeeding, cycle.

After the extraction of the catalyst acid, the aqueous extracting solution is removed from the ester mixture in any convenient manner, for example, by centrifuging, or stratification and separation, and the like.

The ester content of the esterification mixture may then be recovered by any suitable process without danger of ester decomposition. Distillation and/or extraction, and the like, may be safely employed. In certain cases, however, the boiling points of the ester or esters and the esterifying acid or acids may be such as to render their separation difficult by ordinary distillation methods after the mineral acting acid catalyst has been removed. This is particularly true of the normal, iso and secondary butyl esters of aliphatic acids. In such cases we have found that an effective separation may be made by distilling off the ester as a binary azeotrope with water. This may be accomplished by adding a small amount of water and distilling off ester therewith. The azeotrope so removed stratifies, on cooling, into two phases. The lower water phase may be returned as the distillation proceeds; only small amounts of water are thus required and, in fact, large amounts are to be avoided as their subsequent removal from the still bottoms is correspondingly more expensive. In this way the residue from the distillation may be made to approach zero content of ester. The distillation is discontinued when predetermined excesses of carboxylic acid appear in the condensate, that is when any amount of carboxylic acid considered undesirable begins to appear in the condensate One satisfactory procedure is to thus remove the majority, say about 90%, of the ester and then reverse the process. The initially recovered ester is first removed from the system and the still bottoms subjected to distillation. The binary azeotrope of ester and water is condensed, stratified, and the ester phase returned to the column until the bottoms are anhydrous. The water taken off may contain a small amount of esterifying acid but this is of no importance as the same water may be refed to an ester distillation operation, or selective acid removal stage. In this way about 90% of the ester is recovered, all the water removed, and a resulting anhydrous acid-ester mixture obtained as bottoms, which is suitable for recycling to the esterification process.

As a factor of safety, the distillations may be carried out in the presence of small amounts of a metal salt of an organic acid such as of the esterifying acid. Any mineral acting acid formed from the decomposition of its alkyl esters possibly present, will thus be rendered harmless.

The following example illustrates one specific embodiment of our invention as applied to the recovery of secondary butyl acetate from an acid-ester mixture obtained as an intermediate in the preparation of this ester by the procedure described in our copending application, Serial No. 688,062, filed September 2, 1935 issued July 2, 1935 as U. S. Patent 2,006,734. The preparation of the mixture was carried out as follows. A substantially pure butane-butylene fraction of cracked petroleum oil was scrubbed with about 65% sulfuric acid at about 30° C., whereby the iso-butylene content was reduced to less than 1% and a product containing substantially 61% butane and 39% butylenes was obtained. This was agitated for about 1½ hours at about 80° C. with an acetic-sulfuric acid solution containing about 69% acetic acid. The ratio of butane-butylene fraction to acid solution was about 1.25 by weight. After stratification of the acid and hydrocarbon phases, the latter was drawn off and found to have the following approximate composition:

|  | Per cent by weight |
|---|---|
| Secondary butyl acetate | 28.0 |
| Acetic acid | 11.1 |
| Sulfuric acid | 1.7 |
| Polymer | 2.0 |
| Butylenes | 6.2 |
| Butanes | 51.0 |

The practice of our present invention with this mixture was carried out by stirring it vigorously with a solution of acetic acid and calcium acetate in water. The acetic acid concentration was that in equilibrium with the acetic acid in the mixture and the calcium acetate was present in amount sufficient to convert all of the sulfuric acid to calcium sulfate and acetic acid. In this way the sulfuric acid was found to be completely extracted and a precipitate of calcium sulfate was immediately formed. The hydrocarbon and aqueous phases were separated after stratification and the latter filtered to remove the calcium sulfate and then reused for extraction of sulfuric acid from further similar mixtures.

The hydrocarbon phase was then distilled to remove hydrocarbons which were returned for a separate esterification treatment. The remaining mixture containing approximately 66.7% secondary butyl acetate, 28.6% acetic acid and 4.7% polymer was subjected to azeotropic distillation by adding controlled amounts of water during the distillation. An azeotrope boiling at 87° C. and containing 22.5% water was taken off and cooled to room temperature. It then separated into two phases, the lower water phase being approximately 16% by volume. This lower phase was recycled in the distillation until the acetic acid concentration in the condensate began to increase or become more than negligible, at which point the distillation was stopped. The upper ester phase was then again fractionated taking off the remaining water as the azeotrope and leaving a residue of substantially anhydrous ester having the following composition, as determined by analysis:

|  | Per cent |
|---|---|
| Butyl acetate | 97.7 |
| Acetic acid | 0.6 |
| Undetermined | 1.7 |

The bottoms from the first distillation, comprising butyl acetate, acetic acid, water and polymer were then subjected to further azeotropic distillation. After separation of the phases of the condensate, the ester phase was returned to the column until the bottoms were found to be substantially anhydrous, at which point the distillation was stopped. The bottoms were then returned to the esterification process and the water separated therefrom used in the following distillation.

Among other examples of esters which may be recovered in accordance with our invention are, for example, the ethyl, propyl, amyl, allyl, and the like esters of carboxylic acids such as formic, propionic, butyric, isobutyric and the like and their homologues and analogues. The carboxylic acid and/or ester present in the mixture may be saturated or unsaturated and may contain substituents, as halogen, hydroxy groups, and the like.

As mineral acid acting acids which may be successfully removed by our method are included any acid esterification catalyst such as, for example, sulfuric, hydrochloric, phosphoric, chloracetic, sulfoacetic, benzene sulfonic, and the like acids. The term "reacted esterification mixture" as used in the claims is intended to define a mixed product from an esterification effected by means of such acid agents.

Among the salts which may be used for reacting with the mineral acid acting acid extracted by our method from the esterification mixture, preference is given salts of the alkali and alkaline earth metals and particularly the more readily soluble of such salts which form relatively insoluble products with the extracted mineral acid acting acid, such as calcium—, magnesium—, barium— and the like salts with sulfuric acid, for example.

Our process may not only be applied in connection with intermittent or batch esterification methods, as above described by way of illustration, but also may be used with continuous processes in which, for example, the ester mixture is obtained as a distillate from the esterification reactor, i. e., as when the esterification is carried out at, or above, the boiling point of the ester, or an azeotrope thereof, at the pressure employed.

Our process has many advantages in addition to providing a commercially available method for separating all types of esters from admixture with acids. The removal of acids which cause ester decomposition is effected very rapidly and at a room temperature, and the neutralization is carried out in solution. There is no need for rigorous control of the composition of the extracting medium, as the partition coefficient of the carboxylic acid between the mixture being treated and the selective solvent solution automatically controls the composition thereof and prevents losses of valuable reagents.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process of recoving organic carboxylic acid esters from reacted esterification mixtures the steps of selectively extracting catalyst acid therefrom with a solvent medium for said catalyst acid which solvent medium contains an agent in such concentration as is able to effectively prevent the substantial coextraction of any organic carboxylic acid which may be present in said reacted esterification mixtures and substantially recovering the ester content in the substantial absence of catalyst acid.

2. In a process of recovering organic carboxylic acid esters from mixtures comprising an organic acid ester, a carboxylic acid and a mineral acid acting acid the step of extracting the mineral acting acid with a preformed aqueous solution of said carboxylic acid.

3. In a process of recovering organic carboxylic acid esters from mixtures comprising an organic acid ester, a carboxylic acid and a mineral acid acting acid the step of extracting the mineral acting acid therefrom with an aqueous solution in substantial equilibrium with the carboxylic acid content of the mixture.

4. In a process of recovering organic carboxylic acid esters from mixtures comprising an organic acid ester, a carboyxlic acid, and sulfuric acid, the step of extracting sulfuric acid therefrom with an aqueous carboxylic acid solution in substantial equilibrium with the carboxylic acid content of the mixture.

5. In a process of recovering acetic acid esters from mixtures comprising an acetic acid ester, acetic acid, and a mineral acid acting acid, the step of extracting the mineral acting acid therefrom with an aqueous acetic acid solution in substantial equilibrium with the acetic acid content of the mixture.

6. In a process of recovering butyl esters from reacted butylene esterification mixtures the steps of selectively extracting catalyst acid therefrom with a solvent medium for said catalyst acid which solvent medium contains an agent in such concentration as is able to effectively prevent the substantial coextraction of any organic carboxylic acid which may be present in said reacted esterification mixtures and substantially recovering the butyl ester content in the substantial absence of catalyst acid.

7. In a process of recovering butyl acetates from mixtures comprising a butyl acetate, acetic acid and a mineral acid acting acid, the step of extracting the mineral acting acid from the mixture with an aqueous acetic acid solution of at least the concentration of that which would be in equilibrium with the acetic acid in the ester mixture.

8. In a process of recovering organic carboxylic acid esters from reacted esterification mixtures the steps of extracting catalyst acid therefrom with an aqueous solution in substantial equilibrium with the carboxylic acid content of the esterification mixture and reacting the extracted catalyst acid with a metal salt.

9. In a process of recovering organic carboxylic acid esters in accordance with claim 8 the step of reacting the extracted catalyst acid with a salt of a carboxylic acid during extraction.

10. In a process of recovering organic carboxylic acid esters from reacted esterification mixtures the step of extracting catalyst acid therefrom with an aqueous carboxylic acid solution which contains a metal salt capable of reacting with the extracted catalyst acid.

11. In a process of recovering organic carboxylic acid esters from reacted esterification mixtures the steps of extracting catalyst acid therefrom with an aqueous carboxylic acid solution, reacting the extracted catalyst acid with a metal salt and recycling the aqueous carboxylic acid solution for the extraction of fresh esterification mixture.

12. In a process of recovering acetic acid esters from mixtures comprising an acetic acid ester, acetic acid and a mineral acid acting acid, the steps of extracting the mineral acting acid from the ester mixture with an aqueous acetic acid solution, reacting the extracted mineral acting acid with a metal acetate, and recycling the acetic acid solution for the extraction of fresh ester mixture.

13. In a process for recovering organic carboxylic acid esters from reacted esterification mixtures the steps of extracting catalyst acid therefrom with an aqueous carboxylic acid solution in substantial equilibrium with the carboxylic acid content of the esterification mixture and distilling the extracted mixture to recover ester therefrom.

14. A process of recovering organic carboxylic acid esters from esterification mixtures containing free organic carboxylic acids and catalyst acid which comprises freeing said mixture from catalyst acid, distilling the resulting substantially catalyst acid free mixture in the presence of water, condensing and stratifying the distillate into a carboxylic acid ester phase and aqueous phase, recycling the aqueous phase until the free organic carboxylic acid concentration attains a predetermined maximum in the condensate and recovering substantially anhydrous carboxylic acid ester from the ester phase.

15. A process of recovering organic carboxylic acid esters from esterification mixtures containing free organic carboxylic acids and catalyst acid which comprises preliminarily freeing said mixture from catalyst acid, distilling the resulting substantially catalyst acid free mixture in the presence of water, condensing and stratifying the distillate into a carboxylic acid ester phase and an aqueous phase, recycling the aqueous phase until the free organic carboxylic acid concentration in the condensate attains a predetermined maximum, subsequently subjecting the bottoms to distillation, whereby a carboxylic acid ester phase and an aqueous phase are obtained as condensate and recycling the carboxylic acid ester phase until the bottoms are substantially anhydrous.

16. The steps of removing carboxylic acid ester as a binary carboxylic acid ester-water azeotrope from an ester-organic carboxylic acid mixture free from mineral acid acting acid until the bulk of the carboxylic acid ester has been removed and subsequently dehydrating the residue by a distillation treatment wherein the carboxylic acid ester content of the second distillate is returned to the residue.

17. A process for substantially recovering the carboxylic acid ester content of esterification mixtures containing also free organic carboxylic acid and free mineral acid acting acid, which comprises selectively removing the free mineral acting acid with a solvent medium for said mineral acid which solvent medium contains an agent in such concentration as is able to effectively prevent the substantial coextraction of any organic carboxylic acid which may be present in said reacted esterification mixtures, distilling off the bulk of the carboxylic acid ester content from the extracted mixture and dehydrating the bottoms by a distillation treatment wherein the carboxylic acid ester content of the last distillate is returned to the bottoms while the aqueous content of the last distillate is removed from the system.

18. A process for substantially recovering the butyl ester content of butylene esterification mixtures containing also free organic acid and free mineral acid acting acid, which comprises selectively removing the free mineral acting acid with a solvent medium for said mineral acid acting acid containing an organic carboxylic acid, distilling off the bulk of the butyl ester content from the extracted mixture and dehydrating the still bottoms by a distillation treatment wherein the butyl ester content of the last distillate is returned to the bottoms while the aqueous content of the last distillate is removed from the system.

19. A process for recovering butyl acetate from mixtures comprising also free acetic acid and free mineral acid acting acid, which comprises selectively removing the free mineral acting acid with an aqueous solution of acetic acid, distilling off the bulk of the butyl acetate from the extracted mixture and dehydrating the bottoms by a distillation treatment wherein the butyl acetate content of the last distillate is returned to the bottoms while the aqueous content of the last distillate is removed from the system.

20. A process for recovering esters of the class comprising primary and secondary butyl esters from mixtures comprising also free organic acid and sulfuric acid, which comprises selectively removing sulfuric acid with an aqueous solution of an organic carboxylic acid, distilling off the bulk of the ester content from the extracted mixture and dehydrating the bottoms by a distillation treatment wherein the ester content of the last distillate is returned to the bottoms while the aqueous content of the last distillate is removed from the system.

21. In a process of recovering organic carboxylic acid esters from mixtures comprising an organic carboxylic acid ester, a carboxylic acid and a mineral acid, the step of substantially extracting the mineral acid therefrom without substantial removal of carboxylic acid with a solvent medium for said mineral acid containing such a concentration of an organic carboxylic acid as will substantially prevent the co-extraction of carboxylic acid from the mixture undergoing treatment.

22. A process of recovering organic carboxylic acid esters from esterification mixtures containing free carboxylic acid and free mineral acid which comprises selectively extracting substantially the free mineral acid content of said mixture with a solvent medium for said mineral acid containing such a concentration of an organic carboxylic acid as will substantially prevent the co-extraction of carboxylic acid from the mixture undergoing treatment, distilling the resulting substantially mineral acid free mixture in the presence of water, condensing and stratifying the distillate into a carboxylic acid ester phase and an aqueous phase, recycling the aqueous phase until the bulk of the carboxylic acid ester has been removed and subsequently recovering substantially anhydrous carboxylic acid ester from the carboxylic acid ester phase.

THEODORE EVANS.
KARL R. EDLUND.